United States Patent Office 3,184,677
Patented May 18, 1965

3,184,677
STATIC CONTROL PANEL
Julius E. Jacobsen, Wauwatosa, Wis., assignor to Allis-Chalmers Manufacturing Company, Milwaukee, Wis.
Filed Aug. 7, 1961, Ser. No. 129,819
8 Claims. (Cl. 323—89)

This invention relates generally to control systems and in particular to an automatic control system, as in voltage regulation for sensing a deviation of an electrical condition and for initiating a control function in response to the deviation. Automatic controls of the type to which this invention relates may be utilized for step type transformer regulators and control of capacitor banks.

Other control systems of the type to which this invention relates have in the past included electro-mechanical sensing elements that are affected by shock, vibration, friction, corrosion and other adverse conditions. In addition, such control systems of the prior art have generally been objectionable because of their bulky size and weight, necessity for a voltmeter when making an adjustment, relatively long warmup time, and frequent inspection requirements.

The disadvantages of controls embodying mechanically actuated elements as well as those of a magnetic nature involving electronic tube components, are avoided in accordance with the teaching of this invention in which the control circuit for a regulator is comprised primarily of static semiconductor and magnetic sensing elements.

An object of this invention is to provide a new and improved control system.

Another object of this invention is to provide a new and improved voltage regulating control for step type transformers and capacitor banks.

Another object of this invention is to provide a new and improved voltage regulating control which is compact, durable and versatile.

These and other objects and advantages of this invention will be apparent from the following description when read in connection with the accompanying drawing in which.

Figure 1:
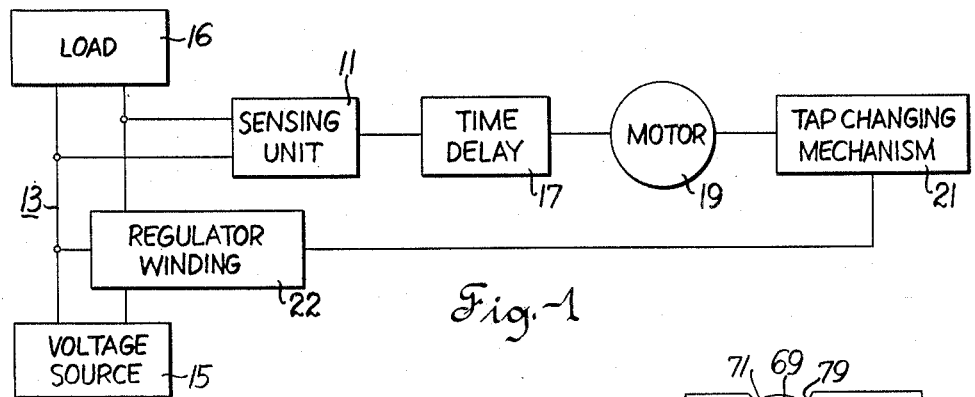
FIG. 1 is a schematic showing of a step type voltage regulating system.

As shown in the block diagram of FIG. 1, a voltage sensing unit 11 is connected to a load circuit 13 for determining when the voltage of the load circuit either exceeds or is less than the desired voltage level. The load circuit includes a voltage source 15 and load 16. Connected to the sensing unit 11 is a time delay device 17 which is connected to a motor 19. This device 17 may be semiconductor, magnetic or mechanical in nature. The motor 19 operates a tap changing mechanism 21 to vary the output of a regulator winding 22 in either its bucking or boosting positions in order to maintain the load voltage within the desired voltage band width.

Figure 2:
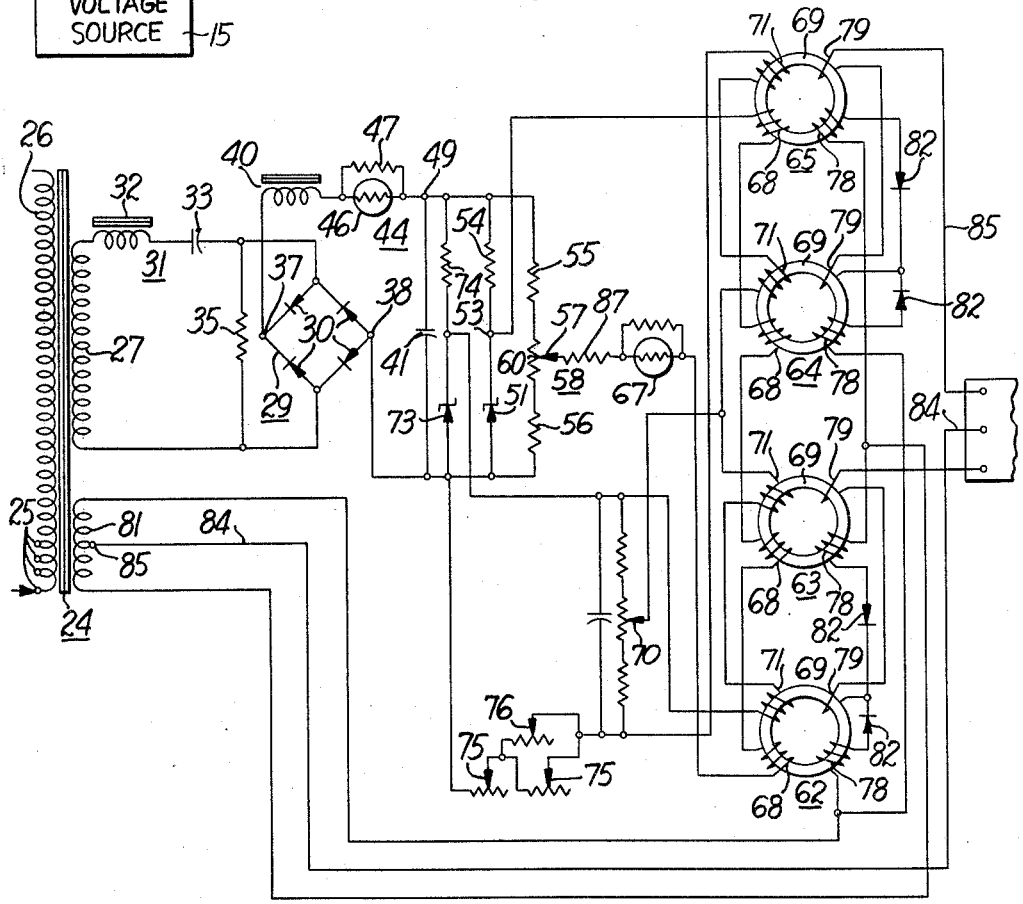
FIG. 2 is a diagrammatic showing of the sensing unit of this invention.

The sensing unit 11 is illustrated in FIG. 2 and includes a sensing transformer 24 which provides a voltage proportional to the load circuit voltage. In the particular instance, primary winding 26 of the sensing transformer may be connected to a potential transformer (not illustrated) which is connected to the load circuit 13. The primary winding may have a tapped section 25 which provides an adjustable voltage level over a wide range, such as 105 volts to 130 volts. Secondary winding 27 of the sensing transformer likewise provides a proportionate voltage across a rectifier bridge 29 comprising four diodes 30.

Inasmuch as the illustrated type of rectifier bridge 29 responds to average voltage rather than R.M.S. voltage, a harmonic filter 31 comprising a choke 32, capacitor 33 and a resistor 35 are provided. In such a manner the sensing unit 11 is made responsive to R.M.S. rather than average voltage. If the output load voltage were to always be a sine wave or contain a fixed percent harmonic distortion, filter 31 would not be necessary. However, since most transmission systems contain a varying amount of harmonic distortion a filter is advisable. For reasons of clarity there has been no showing of a line drop compensator which is usually a conventional element of a control circuit. If so desired a current signal for the operation of the line drop compensator may be injected before the harmonic filter 31. The compensator compensates for the reactance and resistance line voltage drop between the load 16 and sensing unit 11.

The output of the rectifier bridge 29 at points 37 and 38 is a fluctuating D.C. voltage which is proportional to the A.C. load voltage. For a more sensitive operation and to eliminate residual A.C. voltage across points 53 and 60 and resulting associated problems it is desirable that this pulsating D.C. voltage be converted to a smooth D.C. voltage, therefore calling for a filter choke 40 and a filter capacitor 41. Choke 40 provides a choke input to eliminate sensing voltage errors due to variations in capacity of filter capacitor 41, and is designed to insure a continuous current flow.

Temperature compensator 44 compensates for the D.C. copper resistance of the sensing transformer 24 and the copper resistance of the harmonic filter choke 32 and the line drop compensator which is not shown. As shown in the particular illustration of this invention, the temperature compensator 44 includes a thermistor 46 and a resistor 47 across the thermistor 46. This temperature compensator 44 also compensates for the changes in the output voltage of the rectifier bridge 29 and for the change in resistance of the filter choke 40. The temperature compensator is built around an approximate equivalent mass of the elements it compensates, thus greatly reducing transient temperature errors and the warmup time of the control. Therefore, the voltage across points 38 and 49 is a temperature compensated smooth D.C. voltage.

A reference voltage is obtained through the provision of zener diode 51 and its load resistor 54 across the smooth D.C. output 49 and 38. Consequently, the voltage at points 38 and 53 is constant regardless of the change in voltage (within the design rating of reference zener 51) at points 38 and 49. A voltage divider network 58 is connected across points 38 and 49 and comprises two resistors 55 and 56 and rheostat 57. When the voltage supply to the sensing unit is exactly equal to the control panel voltage level adjustment, rheostat 57 is adjusted to a position where the voltage across points 38 and 60 equals the reference voltage across points 38 and 53. Consequently, when the voltage supplied to transformer 24 is equal to the voltage level setting of the sensing unit there is no voltage across points 53 and 60.

Included in the sensing device are four magnetic amplifiers 62, 63, 64 and 65. Each magnetic amplifier has an error signal winding 68 which is wound on a magnetic core 69 and serially connected across points 53 and 60. Under normal operating conditions when the load circuit voltage 13 is within the band width the voltage at points 53 and 60 is sufficient to cause an overbalancing current through the error signal windings 68. To compensate for resistance in windings 68, a second temperature compensator 67 may be connected between rheostat 57 and the signal windings 68. Also wound upon the four cores 69 are four bias windings 71 which are inductively coupled with the error signal windings 68. To compensate for unmatched characteristics of the magnetic amplifier cores 69, a voltage divider network 70 may be provided.

A second zener diode 73 and its load resistor 74 are connected across the rectifier bridge 29 at points 38 and 49 to supply the four bias windings 71 with a smooth constant D.C. voltage. Rheostats 75 which are connected with the bias windings 71 and zener diode 73 are calibrating rheostats. These rheostats may be adjusted to take into account the unmatched voltages which may occur in the production of these zener diodes. Consequently, the bias windings are assured of having a specific voltage across them. In order to narrow or widen the band width which the load voltage is to fall within, rheostat 76 is connected in series with the bias windings which varies the current flow through these windings. It is to be noted that changing this bias winding current (and consequently the band width) by adjustment of rheostat 76 does not alter the total output current of the rectifier bridge 29 due to the zener action of diode 73. For this reason it is not necessary to supply a second set of rectifiers for the bias supply.

Also linked with the four cores 69 of the magnetic amplifiers are four power windings 78 and four feedback windings 79. The power windings are supplied with current from secondary winding section 81 on the main sensing transformer 24. Conductor 84 is connected to a midtap 85 of winding 81. Connected between each of the power windings 78 and feedback windings 79 are four diodes 82 which give full wave rectification for feeding the time delay device 17. The two magnetic amplifiers 62 and 63 and their associated windings comprise the raise direction circuit which is effective when the load voltage calls for an increase. Magnetic amplifiers 64 and 65 and their associated components comprise the lower direction circuit.

In operation, the tapped section 25 of the sensing transformer 24 may be adjusted to a desired voltage level setting such as 120 volts. With fixed discrete taps in winding section 25, the desired voltage level may be selected without the aid of a voltmeter. Rheostat 76 may be adjusted to a particular band width such as two volts. Since this is a calibrated control the band width may also be selected without the aid of a voltmeter. As long as the voltage across the terminals of the sensing transform 24 remains within the band width of 120 plus or minus 1 volt there will be insufficient voltage across points 53 and 60 to force sufficient current through the error signal windings 68 to counterbalance the current through the bias windings 71. If the load voltage rises above 121 volts, this is detected by the sensing transformer 24 and is reflected across points 53 and 60 with the voltage at point 60 being positive with respect to that at point 53. The voltage at point 53 remains unchanged with respect to point 38 due to the action of Zener diode 51. With this potential difference between points 53 and 60, a current will flow through point 53 and through the magnetic amplifier error signal windings 68, temperature compensator 67 and resistor 87 back to terminal 60. This current through the error signal windings 68 is sufficient to counterbalance the constant current in the bias windings 71. With this counterbalancing between the windings, conduction occurs inasmuch as the power windings 78 on the two lower direction magnetic amplifiers 64 and 65 have changed from a high impedance to a low impedance due to staturation of their magnetic amplifier cores 69.

Since magnetic amplifiers 64 and 65 operate to lower the load voltage, the voltage output signal will occur across conductor 85 connected to amplifiers 64 and 65 and conductor 84. The power for this signal is obtained from winding 81. Thus, with conduction now occurring, current supplied from the sensing transformer winding 81 actuates the time delay device. This in turn causes motor 19 to drive the tap changing mechanism 21 associated with regulator winding 22 thereby correcting the high voltage condition.

If desired, the four magnetic amplifiers may have an inverse time delay, or in other words not produce a snap action in saturating the windings at the edges of the band width. With the proper combination of resistor 87 and the number of turns in the error signal windings 68 and feed-back windings 79, the conduction time constant of the magnetic amplifier can be controlled to have an inverse time delay. Consequently, the amplifiers have a built-in variable time delay and supplement the time delay device 17. In this manner if there is only a momentary line voltage deviation, unnecessary actuation of the time delay device 17 is avoided, also, should the output voltage go out of the band width limit by only a small amount, for example, .1 volt, this inverse time delay can give a substantial increase over the preselected time delay of the time delay relay 17. As the output voltage deviates further from the band width limit, the inverse time delay will disappear leaving the time delay as set on the time delay relay 17. The point at which this inverse time delay disappears can be controlled by the design of resistor 87, feedback windings 79 and the error signal windings 68.

It is apparent that the invention is not limited to the particular features of the design and construction described herein and shown in the drawing and that the invention includes such other forms and modifications as are embraced within the scope of the annexed claims.

Having now particularly described and ascertained the nature of my said invention and the manner in which it is to be performed, I declare that what I claim is:

1. In a control system for supplying a signal to a motor that operates in response to the signal to adjust the voltage of a transmission line in the direction to reduce the signal: means connected to said line for providing an ouput voltage proportional to the line voltage; means connected across said output for supplying a proportionate D.C. voltage; first constant voltage means connected to said proportionate D.C. output for maintaining a constant reference voltage; error signal means connected to the output of said reference voltage and the output of said proportionate D.C. voltage for transmitting an error signal varying in polarity in response to the direction of a difference between said two voltages; a counteracting means opposing the effect of said error signal means; a power signal means responsive to said error signal and said counteracting means for transmitting a direction controlling signal to the motor in response to the effect of said error signal in excess of said counteracting means; and a second constant voltage means connected across said proportionate D.C. voltage means for maintaining said counteracting means with a constant opposition effect.

2. In a control system for supplying a signal to a motor that operates in response to the signal to adjust the voltage of a transmission line in the direction to reduce the signal; means connected to said line for providing an output voltage proportional to the line voltage; means connected across said output for supplying a proportionate D.C. voltage; a first semiconductor means connected to said proportionate D.C. output for maintaining a constant reference voltage; error signal means connected to the output of said reference voltage and the output of said proportionate D.C. voltage for transmitting an error signal varying in polarity in response to the direction of a difference between said two voltages; a counteracting means opposing the effect of said error signal means; a power signal means responsive to said error signal and said counteracting means for transmitting a direction controlling signal to the motor in response to the effect of said error signal in excess of said counteracting means; and a second semiconductor means connected across said proportionate D.C. voltage means for maintaining a constant D.C. voltage on said counteracting means.

3. In a control system for supplying a signal to a motor that operates in response to the signal to adjust the voltage of an A.C. transmission line in a direction to reduce the signal: means connected to said line for providing an output voltage proportional to the line voltage; conversion means connected across said output for supplying a proportionate R.M.S. D.C. voltage; a first semiconductor means connected to said proportionate D.C. output for maintaining a constant reference voltage; means connected to the output of said reference voltage and the output of said proportionate D.C. voltage for providing an error signal varying in polarity in response to the direction of a difference between said two voltages; a magnetic amplifier having a signal winding connected to receive said error signal; a bias winding opposing the effect of energizing said signal winding in one polarity; a power winding for transmitting a signal to operate the motor in response to the effect of said signal winding in excess of said bias winding opposition; and a second semiconductor means connected across said conversion means for maintaining a constant bias current.

4. In a control system for supplying a signal to a motor that operates in response to the signal to adjust the voltage of an A.C. transmission line in a direction to reduce the signal: means connected to said line for providing an output voltage proportional to the line voltage; conversion means connected across said output for supplying a proportionate filtered R.M.S. D.C. voltage; a first zener diode connected to the output of said conversion means for maintaining a constant reference voltage; means connected to the output of said reference voltage and the output of said D.C. voltage for transmitting an error signal varying in polarity and magnitude in response to a difference between said two voltages; magnetic amplifier means having a signal winding connected to receive said error signal; a bias winding opposing the effect of said signal winding; a power winding means for transmitting a polarity varying signal in algebraic response to the effect of said signal winding in excess of said bias winding opposition, and a second zener diode connected across said conversion means for maintaining a constant bias current.

5. In a control system for supplying a signal to a motor that operates in response to the signal to adjust the voltage of an A.C. transmission line in a direction to reduce the signal: means connected to said line for providing an output voltage proportional to the line voltage; conversion means connected across said output for supplying a proportionate filtered R.M.S. D.C. voltage; a first semiconductor means connected to said D.C. output for maintaining a constant reference voltage; means connected to the output of said reference voltage and the output of said proportionate R.M.S. D.C. voltage for transmitting an error signal varying in polarity and magnitude in response to a difference between said two voltages; a pair of magnetic amplifiers, each said amplifier having a signal winding, bias winding and power winding, said signal winding being connected to receive said error signal; each said bias winding opposing the effect of a different polarity of said error signal; each said power winding transmitting a signal in algebraic response to the effect of said signal winding in excess of said bias winding opposition; and a second semiconductor means connected across said conversion means for maintaining a constant bias current.

6. In a control system for supplying a signal to a motor that operates in response to the signal to adjust the voltage of an A.C. transmission line in a direction to reduce the signal: a transformer connected to said line for providing an output voltage proportional to the line voltage; a conversion means connected across said output for supplying a proportionate D.C. voltage, said conversion means including a harmonic filter and a rectifier; a first reference diode connected to said proportionate D.C. output for maintaining a constant reference voltage; means connected to the output of said reference voltage and the output of said proportionate D.C. voltage for transmitting an error signal varying in polarity and magnitude in response to a difference between said two voltages; a magnetic amplifier having a signal winding connected to receive said error signal; a bias winding opposing the effect of said signal winding; a power winding connected to control a circuit energized by said transformer for transmitting a signal to control the direction of the motor in response to the effect of said signal winding in excess of said bias winding opposition; and a second reference diode connected across the proportionate D.C. output of said conversion means and connected to said bias winding for maintaining a constant bias current.

7. In a control system for supplying a signal to a motor that operates in response to the signal to adjust the voltage of an A.C. transmission line in a direction to reduce the signal: a transformer connected to said line for providing an output voltage proportional to the line voltage; a conversion means connected across said output for supplying a proportionate D.C. voltage, said conversion means including a harmonic filter, a rectifier and a temperature compensator means; a first zener diode connected to said D.C. output for maintaining a constant reference voltage; means connected to the output of said reference voltage and the output of said proportionate D.C. voltage for transmitting an error signal varying in polarity and magnitude in response to a difference between said two voltages; a magnetic amplifier having a signal winding connected to receive said error signal; a bias winding opposing the effect of said signal winding; a power winding connected to control a circuit energized by said transformer for transmitting a signal to control the motor in response to the effect of said signal winding in excess of said bias winding opposition; and a second zener diode connected across the output of said conversion means and connected to said bias winding for maintaining a constant bias current.

8. In a control system for supplying a signal to a motor that operates in response to the signal to adjust the voltage of an A.C. transmission line in a direction to reduce the signal: a transformer connected to said line for providing an output voltage proportional to the line voltage; a conversion means connected across said output for supplying a proportionate D.C. voltage, said conversion means including a harmonic filter, a rectifier bridge and a temperature compensator means; a first zener diode connected to said D.C. output for maintaining a constant reference voltage; means connected to the output of said reference voltage and the output of said proportionate D.C. voltage for providing an error signal varying in polarity and magnitude in response to a difference between said two voltages; a pair of magnetic amplifiers, each said amplifier having a signal winding, bias winding and power winding, said signal winding being connected to receive said error signal; each said power winding connected to control a circuit energized by said transformer for transmitting a signal to control the motor in algebraic response to the effect of said signal winding in excess of said bias winding opposition; and a second zener diode connected across said conversion means and connected to said bias winding for maintaining a constant bias current.

References Cited by the Examiner
UNITED STATES PATENTS

| 2,801,383 | 7/57 | Comins et al. | 323—66 |
| 2,892,975 | 6/59 | Eilers | 323—89 |
| 2,974,271 | 3/61 | Guth et al. | 323—66 |
| 3,054,943 | 9/62 | Kettler et al. | 323—66 |
| 3,086,165 | 4/63 | Dortort | 323—66 |

LLOYD McCOLLUM, *Primary Examiner.*